United States Patent
Duault et al.

(10) Patent No.: US 6,912,224 B1
(45) Date of Patent: Jun. 28, 2005

(54) ADAPTIVE PLAYOUT BUFFER AND METHOD FOR IMPROVED DATA COMMUNICATION

(75) Inventors: Maurice Duault, Saint-Laurent-du Var; Bernard Pucci, Cagnes-sur-mer; Serge Leroy, Le Rouret; Gerard Richter, Saint Jeannet; Francois Kermarec, Cagnes-sur-mer; Aline Fichou, La Colle-sur-Loup, all of (FR)

(73) Assignee: International Business Machines Corporation, Armonk, NY (US)

( * ) Notice: Subject to any disclaimer, the term of this patent is extended or adjusted under 35 U.S.C. 154(b) by 997 days.

(21) Appl. No.: 09/021,707

(22) Filed: Feb. 10, 1998

(30) Foreign Application Priority Data

Nov. 2, 1997 (EP) ............................................ 97480006

(51) Int. Cl.⁷ ............................................. H04L 12/28
(52) U.S. Cl. ....................................................... 370/412
(58) Field of Search ................................. 370/412, 401, 370/463, 394, 400, 516, 395, 473, 474, 507, 509, 542, 232, 396, 468, 418, 545; 375/371

(56) References Cited

U.S. PATENT DOCUMENTS

| 5,412,431 | A | * | 5/1995 | Vogel ..................... 375/240.03 |
|---|---|---|---|---|
| 5,450,410 | A | * | 9/1995 | Hluchyj et al. .............. 370/394 |
| 5,600,641 | A | * | 2/1997 | Duault et al. ................ 370/400 |
| 5,740,173 | A | * | 4/1998 | Fiorini ........................ 370/394 |
| 5,742,649 | A | | 4/1998 | Muntz et al. |
| 5,761,203 | A | * | 6/1998 | Morales ....................... 370/418 |
| 5,812,618 | A | | 9/1998 | Muntz et al. |
| 5,844,891 | A | * | 12/1998 | Cox ....................... 370/395.62 |
| 6,034,945 | A | | 3/2000 | Hughes et al. |
| 6,044,092 | A | * | 3/2000 | Jayawardena et al. ...... 370/516 |
| 6,118,791 | A | | 9/2000 | Fichou et al. |
| 6,181,711 | B1 | | 1/2001 | Zhang et al. |
| 6,212,181 | B1 | | 4/2001 | Divivier et al. |
| 6,247,072 | B1 | | 6/2001 | Firestone |
| 6,259,677 | B1 | | 7/2001 | Jain |

FOREIGN PATENT DOCUMENTS

WO    WO 95/14337 A1    5/1995

* cited by examiner

*Primary Examiner*—Kwang Bin Yao
*Assistant Examiner*—Prenell Jones
(74) *Attorney, Agent, or Firm*—Cesari and McKenna, LLP

(57) ABSTRACT

An adaptive apparatus and method for managing a playout buffer (POB) in an edge node of a packet-based data communications network, such as an ATM network, in order to reduce the end-to-end communication delay introduced thereby and to allow the POB filling level to be corrected in the event of clock speed differences. A monitoring mechanism determines if the minimum filling level of the playout buffer over a time period whereby the average filling level of the playout buffer is reduced according to the minimum filling level of the playout buffer over the time period.

33 Claims, 4 Drawing Sheets

ADAPTIVE PLAYOUT BUFFER AND METHOD FOR IMPROVED DATA COMMUNICATION

BACKGROUND OF THE INVENTION

1. Field of the Invention

The invention relates to data communications and, more particularly, to improvements in the management of playout buffers (POB) in packet-based communications networks.

2. Description of Prior Art

In order to transport constant bit rate (CBR) traffic, such as telephone conversations or real time video transmissions, modern high-speed, packet-based telecommunications networks, such as those based on Asynchronous Transfer Mode (ATM) technology, make use of playout buffers in receiving nodes at the edge of the network to smooth out differences in the queuing delays that each packet in a data stream experiences as it passes through the network.

The playout buffer is generally arranged to operate as a first-in/first-out (FIFO) buffer in which data is placed when it arrives at the node. Data is then dequeued from the playout buffer uniformly so as to preserve the constant bit rate of the data stream being transmitted. Packet sequence numbers can be used to ensure the data is played out in the correct order and to detect packet loss.

The use of a playout buffer inevitably introduces an overall end-to-end delay in the data stream being transmitted. For real time applications, it can be vitally important to minimize this delay. For example, for voice traffic in a telephone application, an end-to-end delay of more than about 200 milliseconds will be perceivable by the parties in a call. This is clearly undesirable for users and may require the use of echo cancellation techniques or the like.

A variety of techniques have been proposed for the management of playout buffers. Typically, these techniques involve estimating the maximum variation in the transmission delay expected for each packet as it passes through the network, the variation being a parameter also known as the maximum jitter or maximum cell delay variation (CDV). In ATM networks the CDV parameter is estimated by the routing mechanisms at call set-up time. The size of the playout buffer is chosen such that variations in cell arrival time of this order can be smoothed. The end-to-end delay introduced using this approach is then approximately equal to the maximum jitter estimated for the packet data stream. Special techniques are generally provided to handle the relatively rare cases when the playout buffer is either full when a packet arrives, which is referred to as an overrun, or empty when a packet is due to be played out, which is referred to as an underrun.

U.S. Pat. No. 5,450,410 issued Sep. 12, 1995, describes such management of a playout buffer and accompanying conventional underrun and overrun processing. In the system described in the '410 patent, if the number of packets in the buffer is greater than a threshold L when a packet arrives, the arriving packet is dropped; and if the number of packets in the buffer falls below a threshold K, a dummy packet is enqueued in the buffer to avoid an underrun.

PCT application published under number WO 95/14337 proposes a system in which arriving packets are time stamped before being placed in a playout buffer. An adaptive algorithm periodically measures the longest waiting times of packets in the playout buffer and adjusts the packet playout times so that the expected longest waiting time will be equal to the expected maximum jitter.

Techniques are also required to deal with possible slight differences in clock speeds at each end of a CBR link. This can lead to a drift in the average filling level of the playout buffer which, if not corrected, can lead to excessive overruns or underruns.

One standard method to adjust the filling level in the Play Out Buffer (POB) for asynchronous communication is called Adaptive Clock Recovery (ACR), described in International Telecommunication Union (ITU) recommendation I.363.1. The average waiting time in the POB is monitored. When the waiting time is too great or tends to increase with time, the frequency of the service clock between an edge node or IWF and a Private Branch Exchange (PBX) is increased to cause the POB to drain more quickly. When the average waiting time is too small, the service clock is decreased to cause the POB to drain less quickly. Adaptive Clock Recovery is appropriate for an asynchronous situation where the input service clock frequency must be recovered at the output IWF. However, it is not suitable for a synchronous situation where the service clock frequency is constant.

The problem with the above described conventional POB management techniques is that the methods used to estimate the maximum jitter are somewhat imprecise. Commonly, the maximum end-to-end delay for a particular connection is calculated based on the assumption that the maximum delay is bounded by the sum of the maximum delays in each link in the network path allocated to the connection. Moreover, the maximum delay per link is often computed as the maximum buffer size at the link divided by the line speed. In consequence, the resulting estimate of the maximum jitter is generally extremely pessimistic. The inventors have found that, under realistic network conditions, the estimated maximum jitter is often more than 10 times greater than the actual jitter experienced over a long period of time.

Furthermore, the jitter experienced on any particular connection within the network can change rapidly over time due to changing network conditions, such as other connections being set up and removed.

SUMMARY OF THE INVENTION

An object of the present invention to provide a simple technique for managing a playout buffer in a communication network in order to reduce end-to-end communication delay introduced therein and to adjust the POB filling level in the event of clock speed differences.

Another object is an apparatus and method for improving performance of a playout buffer in a communications network.

Another object is an apparatus and method including control logic arranged to alter the filling level of a playout buffer occurring to a threshold.

Another object is an apparatus and method of reducing average packet waiting time and gradual drifts in a playout buffer in a communication network due to clock signal speed differences.

Another object is an adaptive playout buffer reducing average packet waiting time and gradual drifts in a communication network due to clock signal speed differences which are automatically corrected.

In brief, this object is achieved by data receiver apparatus for use in an edge node of a packet based data communications network. The apparatus includes a playout buffer for controlling the rate at which data arriving at the apparatus is processed. A mechanism is provided for monitoring the minimum filling level of the playout buffer over a time period and the average filling level of the playout buffer is reduced according to the minimum filling level of the playout buffer over the time period.

In a preferred embodiment, the monitoring mechanism comprises means arranged to repeatedly compare the filling level of the playout buffer with a threshold and control logic is arranged to reduce the average filling level of the playout buffer if the filling level of the playout buffer has remained above the threshold over the time period.

Suitably, the apparatus can be arranged to reduce the average filling level of the playout buffer at the end of the time period by removing data, preferably a predefined number of bytes, from the playout buffer. Existing slip mechanisms for handling overruns can thereby be employed.

With this arrangement, the average waiting time in the POB is reduced and gradual drifts in the POB filling level due to clock speed differences are automatically corrected. In addition, the data loss caused by the slips is distributed over time thereby reducing the impact on the quality of the connection.

The playout buffer can have a fixed size for each data connection, the fixed size being established when the connection is set up. This enables rapid variations in the jitter in the network to be accommodated without excessive overruns or underruns.

BRIEF DESCRIPTION OF THE DRAWINGS

The foregoing and other objects, aspects and advantages will be better understood from the following detailed description of a preferred embodiment of the invention with reference to the appended drawings, in which.

DETAILED DESCRIPTION OF PREFERRED EMBODIMENTS OF THE INVENTION

Figure 1:
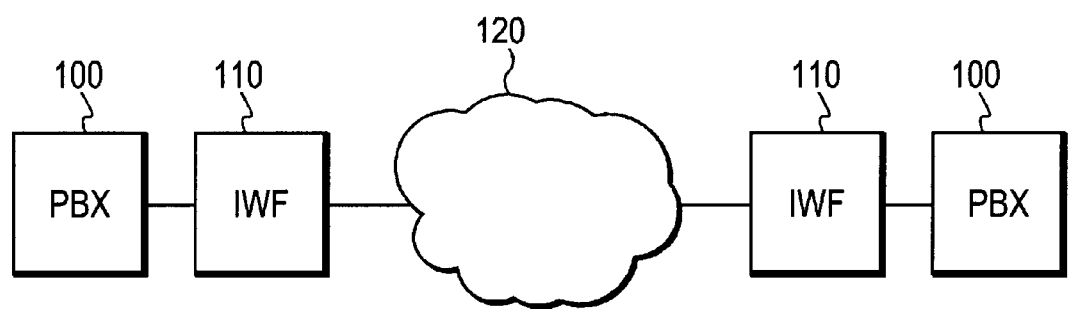
FIG. 1 shows data communications apparatus.

FIG. 1 is a schematic diagram showing a data communications system in which two Private Branch Exchanges (PBX) 100 are interconnected via a CBR connection within an ATM data communications network 120. PBXs 100 are connected to the network at edge nodes 110. Edge nodes 110 provide an interworking function (IWF) to convert the Constant Bit Rate (CBR) traffic from the PBX into ATM cells for transmission over network 120.

While this embodiment has been developed for use in ATM networks, it will be appreciated that the techniques to be described would be equally applicable to other types of packet-based networks, such as those based on Frame Relay or the Internet Protocol (IP).

Figure 2:
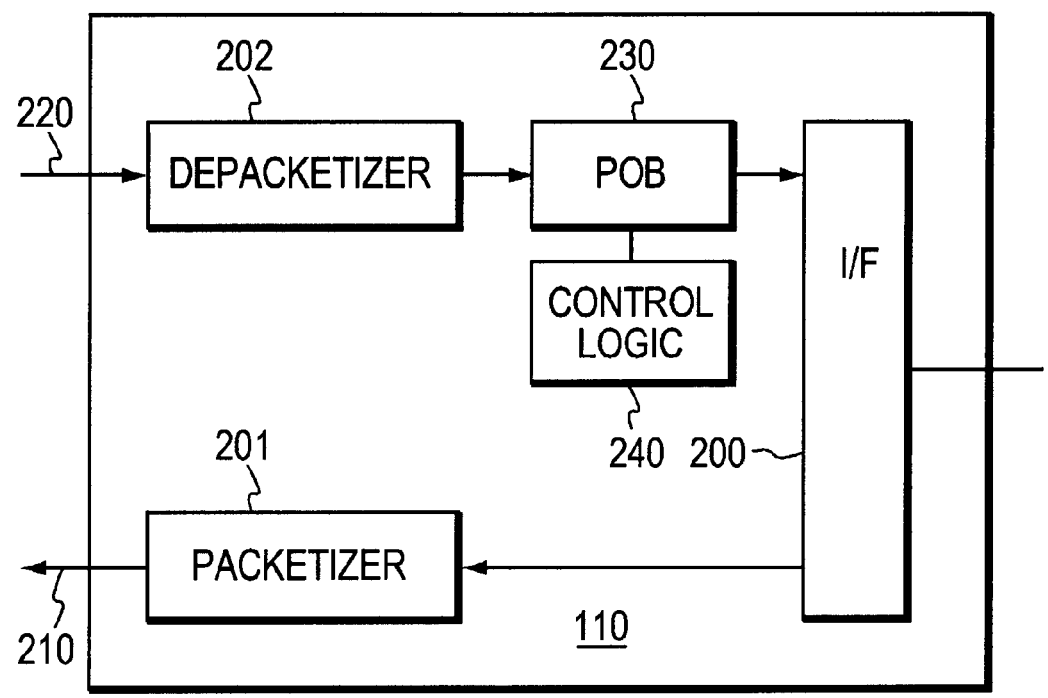
FIG. 2 shows an edge node in the apparatus of FIG. 1 incorporating the principles of the present invention.

As shown in FIG. 2, edge nodes 110 comprise an interface 200 for interfacing with the PBX nodes 100, Playout Buffer (POB) 230 and associated control logic 240. Node 110 includes packetizer 201 which places data to be transmitted from PBX 1000 into data packets which are then sent over ATM network 120 over link 210. Packets received from network 120 arrive over link 220. The packet headers are removed by depacketizer 202 and the packet payload data are placed in playout buffer 230. The payload data is then removed from playout buffer 230 in a controlled manner so as to preserve the constant bit rate nature of the traffic. The data is passed to the PBX via interface 200.

The general operation of such a communications system is conventional and, as such, will be well understood by those skilled in the art.

The playout buffer 230 is managed by control logic 240 so as to minimize the queuing delay and the number of overruns and underruns on the basis that the maximum jitter can be experienced only when the network is highly congested with a large number of low speed connections at the highest priority. In most other configurations, the jitter experienced is much smaller.

Conventional processes, known as slips, are provided to handle underruns and overruns. The standard process for handling an underrun consists of adding a predefined number of bytes to the POB. This kind of slip increases the waiting time for each packet inside the POB. In the case of an overrun, the standard process consists of suppressing a predefined number of bytes to adjust the length of the data inside the POB.

Again, as is conventional, the size of the POB is set for each connection at call set-up time in accordance with the maximum jitter (JMAX) expected for that connection. The size of the POB for each connection remains fixed.

In addition to these conventional processes and in order to minimize the waiting time in the POB, the algorithm employed by control logic 240 is such that if the minimum waiting time in the POB is greater than a threshold during a defined period of time, a slip is performed at the end of the period to remove a quantity N-bytes of data from the POB.

Figure 3:
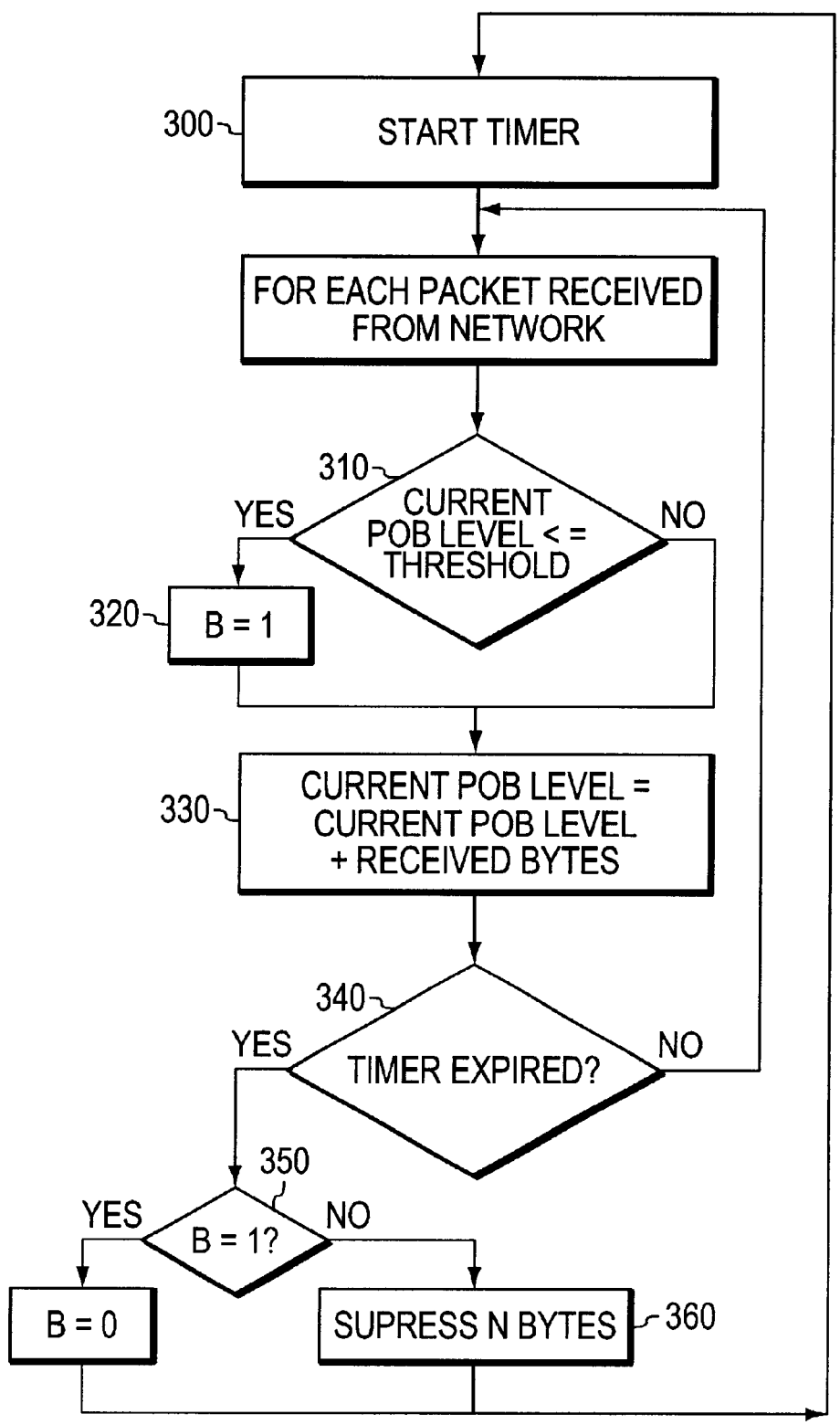
FIG. 3 is a flow diagram illustrating a playout buffer management algorithm in the apparatus of FIG. 2.

FIG. 3 is a flow chart illustrating this aspect of the playout buffer management algorithm.

The process is as follows. A timer is started in step 300. Each time a packet is received from the network the current POB level is checked against a threshold in step 310. If the current POB level is less than or equal to the threshold then a flag B is set to 1 in step 320. The POB level is then augmented by the number of bytes in the received packet in step 330. Of course, each time a packet is removed from the POB, the POB level will be reduced by the number of bytes in the packets which is removed. This aspect is not shown in FIG. 3, but is conventional.

A check is made in step 340 to see whether the timer has expired. If not, the system waits to receive another packet from the network, which is processed in the same way. If the timer has expired, it is determined whether the flag B has been set to 1 in step 350. If it has, then B is set to zero, the timer set to zero and the process repeated. If B has not been set to one, i.e., POB level has remained greater than the threshold throughout the timer period, then in this case, N-bytes of data are removed from the POB in step 360 before the process is repeated.

In practical embodiments the timer period can be of the order of one minute. During this time a very large number of packets will normally have been received and processed via the POB.

Figure 4:
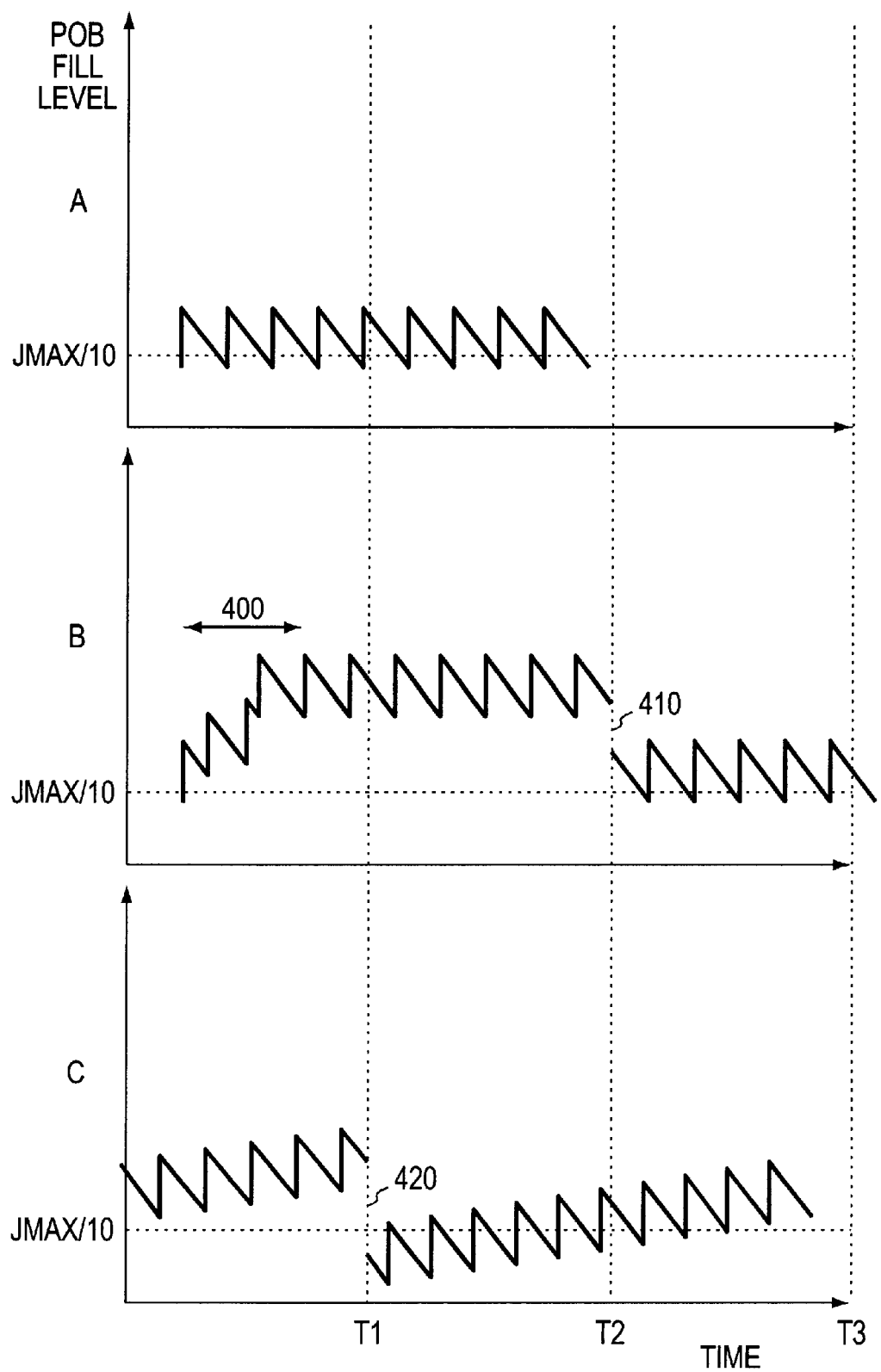
FIG. 4 shows examples of the effects of the algorithm of FIG. 3 in the apparatus of FIG. 2.

The effect of this algorithm is illustrated in the following examples. In FIG. 4 graphs A, B and C the filling level of the POB is represented schematically on the Y axis and time on the X axis. The timer periods are represented as T1, T2 and T3. The filling level of the POB is shown as being oscillatory for the purposes of illustration, although it will of course be understood that the variation of the POB is in reality somewhat random depending upon the arrival times of packets over the network.

Referring to graph A of FIG. 4, the jitter in this example is small and clocks are synchronized. The minimum waiting time remains fairly constant, and smaller than the threshold which has been chosen at JMAX/10. The algorithm does not trigger any adjustment since the minimum waiting time is sufficiently low.

Referring to graph B of FIG. 4, the network experiences a large jitter during a limited period of time 400.

The jitter increases the average waiting time in the POB. When the jitter in the network decreases, the minimum waiting time in the POB becomes higher than the threshold throughout period T3, and the algorithm performs an adjustment, indicated at 410, at the end of period T3 to decrease the minimum waiting time.

Referring to graph C of FIG. 4, the PBX clock on the transmit side has a slightly higher frequency than the PBX clock of the receive side. The waiting time in the POB increases and the minimum waiting time remains greater than the threshold during period T1. The algorithm performs an adjustment, indicated at 420, at the end of the period to decrease the minimum waiting time before the occurrence of any overruns. The buffer is never overloaded, and the waiting time in the POB is reduced.

It can be seen that, using the above described algorithm, the average waiting time in the POB is reduced and gradual drifts in the POB filling level due to clock speed differences are automatically corrected. However, since the POB size is unchanged, rapid variations in the jitter in the network can be accommodated without excessive overruns or underruns. Moreover, data loss caused by the slips is distributed over time thereby reducing the impact on the quality of the connection.

While the invention has been described in terms of preferred embodiments, those skilled in the art will recognize that the invention can be practiced with modification within the spirit and scope of the appended claims.

We claim:

1. Data receiver apparatus for use in an edge node of a packet based data communications network, comprising:
    a playout buffer (POB) having a filling level and controlling the rate at which data arriving at the apparatus is processed;
    means for monitoring a minimum filling level of the playout buffer over a time period; and
    control logic arranged to reduce an average filling level of the playout buffer according to the minimum filling level of the playout buffer over the time period, said control logic removing and discarding a desired number of bytes of data from the playout buffer.

2. Apparatus as claimed in claim 1 wherein the monitoring means further comprises:
    means arranged to repeatedly compare the filling level of the playout buffer (POB) with a threshold and wherein the control logic is arranged to reduce the average filling level of the playout buffer if the filling level of the playout buffer has remained above the threshold over the time period.

3. Apparatus as claimed in claim 2 wherein the control logic is arranged to reduce the average filling level of the playout buffer (POB) by removing data from the playout buffer.

4. Apparatus as claimed in claim 3 wherein the data removed from the playout buffer (POB) is a predefined number of bytes.

5. Apparatus as claimed in claim 1 wherein the control logic is arranged to reduce the average filling level of the playout buffer (POB) at the end of the time period.

6. Apparatus as claimed in claim 1 wherein the playout buffer (POB) has a fixed size for each data connection, the fixed size being established when the connection is set up.

7. Apparatus as claimed in claim 1 wherein the monitoring means provides a constant bit rate traffic over an ATM network.

8. A communications node for an ATM network for reducing end-to-end delay in a communications network comprising a playout buffer (POB) having a filling level and controlling the rate at which data arriving at the node is processed;
    means for monitoring a minimum filling level of the playout buffer (POB) over a time period; and
    control logic arranged to reduce the average filling level of the playout buffer (POB) according to the minimum filling level of the playout buffer over the time period, said control logic removing and discarding a desired number of bytes of data from the playout buffer.

9. In a communications network including a playout buffer (POB), control logic and monitoring means, a method for controlling the rate at which data arriving at the playout buffer is processed comprising the steps of:
    monitoring the minimum filling level of the playout buffer over a time period; and
    reducing the average filling level of the playout buffer according to the minimum filling level of the playout buffer over the time period, said reducing the average filling level of the playout buffer accomplished by removing and discarding a desire number of bytes of data from the playout buffer.

10. The method as claimed in claim 9 further comprising the steps of:
    repeatedly comparing the filling level of the playout buffer (POB) with a threshold; and
    reducing the average filling level of the playout buffer if the filling level of the playout buffer has remained above the threshold over the time period.

11. The method as claimed in claim 10 further comprising the steps of reducing the average filling level of the playout buffer (POB) by removing data from the playout buffer.

12. The method as claimed in claim 11 further comprising the steps of removing a defined number of bytes from the playout buffer (POB).

13. The method as claimed of claim 12 further comprising the step of reducing the average filling level of the playout buffer (POB) at the end of the time period.

14. In a communication network, an adaptive apparatus for reducing end-to-end communications delay in the network comprising:
    a playout buffer (POB) having a filling level and coupled to the network;
    means for monitoring a minimum filling level of the playout buffer; and
    control logic for reducing an average filling level of the playout buffer according to the minimum filling level of the playout buffer over a time period, said control logic removing and discarding a desired number of bytes of data from the playout buffer.

15. The adaptive apparatus of claim 14 further comprising:
    means to repeatedly compare the filling level of the playout buffer (POB) with the threshold; and
    means in the control logic to reduce an average filling level of the playout buffer if the filling level of the playout buffer has remained above the threshold over the time period.

16. An adaptive edge node in a packet communications network comprising:
  a. a depacketizer for receiving packets from the network;
  b. a play out buffer coupled to the depacketizer;
  c. an interface coupled to the play out buffer and to at least one data terminal;
  d. the interface transferring packets from the play out buffer to the at least one terminal and receiving packets from the at least one terminal;
  e. a packetizer coupled to the interface for transferring packets from the at least one terminal to the network; and
  f. control means coupled to the play out buffer for reducing an average filling level of the playout buffer according to a desired filling level and discarding data when the average filling level exceeds a threshold filling level of the playout buffer over a time period.

17. The edge node of claim 16 further comprising:
  a) means included in the control logic to minimize queuing delay in the packets stored in the play out buffer and the number of packet overruns and underruns in the play out buffer.

18. In a packet communications network including a playout buffer (POB), control logic including a timer and monitoring means, a method for controlling the rate at which data arriving at the playout buffer is processed comprising the steps of:
  a) starting the timer for a play out buffer waiting time;
  b) storing each packet received from the network in the play out buffer;
  c) comparing current stored packet level in the play out buffer packet versus a threshold; a "yes" condition setting a flag to an integer and advancing the process to step (d); a "no" condition advancing the process to step (d);
  d) augmenting the store packet level in the play out buffer with the packets received in step (b);
  e) determining if the timer has expired; a "no" condition returning the process to step b) to process another packet; a "yes" condition determining if the flag in step c) has been set to an integer;
  f) resetting the flag to zero if the flag is set at the integer and returning the process to step b); and
  g) releasing a predetermined number of packets from the play out buffer to the network if the flag has not been set to the integer and returning the process to step b).

19. Data receiver apparatus for use in an edge node of a packet based data communications network, comprising:
  a playout buffer (POB) having a filling level and controlling the rate at which data arriving at the apparatus is processed;
  control logic to repeatedly monitor an instantaneous filling level to determine monitored values of the playout buffer (POB) over a time period; and
  control logic arranged to discard data from the playout buffer (POB) when each of the monitored values is above a threshold level during the time period.

20. Apparatus as claimed in claim 19 wherein the data removed from the playout buffer (POB) is a predefined number of bytes.

21. Apparatus as claimed in claim 19 wherein the control logic is arranged to reduce the filling level of the playout buffer (POB) at the end of the time period.

22. Apparatus as claimed in claim 19 wherein the playout buffer (POB) has a fixed size for each data connection, the fixed size being established when the connection is set up.

23. Apparatus as claimed in claim 19 wherein the receiver apparatus provides a constant bit rate traffic over an ATM network.

24. A communications node for an ATM network for reducing end-to-end delay in a communications network comprising:
  a playout buffer (POB) having a filling level and controlling the rate at which data arriving at the node is processed;
  control logic to repeatedly monitor an instantaneous filling level to determine monitored values of the playout buffer (POB) over a time period; and
  control logic arranged to discard data from the playout buffer (POB) when each of the monitored values is above a threshold level during the time period.

25. In a communications network including a playout buffer (POB) and control logic, a method for controlling the rate at which data arriving at the playout buffer (POB) is processed comprising:
  repeatedly monitoring an instantaneous filling level to determine monitored values of the playout buffer (POB) over a time period; and
  discarding data from the playout buffer (POB) when each of the monitored values is above a threshold level during the time period.

26. The method of claim 25 wherein said discarding data further comprising:
  removing a defined number of bytes from the playout buffer (POB).

27. The method of claim 25 further comprising:
  discarding data from the playout buffer (POB) at the end of the time period.

28. In a communication network, an adaptive apparatus for reducing end-to-end communication delay in the network comprising:
  a playout buffer (POB) having a filling level and coupled to the network;
  control logic to repeatedly monitor an instantaneous filling level of the playout buffer (POB) to determine monitored values; and
  control logic for discarding data from the playout buffer (POB) when each of the values is above a threshold level during the time period.

29. A computer readable media, comprising:
  said computer readable media containing information having instructions for execution in a node, for the practice of the method of claim 9 or claim 18 or claim 25.

30. Electromagnetic signals propagating on a computer network, comprising:
  said electromagnetic signals carrying information having instructions for execution in a node, for the practice of the method of claim 9 or claim 18 or claim 25.

31. An apparatus to control the rate at which data arriving at a node of a communications network is processed, the node having a playout buffer (POB), comprising:
  means for repeatedly monitoring an instantaneous filling level to determine monitored values of the playout buffer (POB) over a time period; and
  means for discarding data from the playout buffer (POB) when each of the monitored values is above a threshold level during the time period.

32. The apparatus of claim 31 further comprising:
  means for removing a defined number of bytes from the playout buffer (POB) while discarding said data from the POB.

33. The method of claim 31 further comprising:
  means for discarding data from the playout buffer (POB) at the end of the time period.

* * * * *